(12) United States Patent
Colboch

(10) Patent No.: US 9,044,095 B2
(45) Date of Patent: Jun. 2, 2015

(54) ACTIVATION DEVICE FOR MOTION ACTIVATED FURNITURE

(75) Inventor: Robert Colboch, Athens, TN (US)

(73) Assignee: P.I., Inc., Athens, TN (US)

( * ) Notice: Subject to any disclaimer, the term of this patent is extended or adjusted under 35 U.S.C. 154(b) by 177 days.

(21) Appl. No.: 13/439,607

(22) Filed: Apr. 4, 2012

(65) Prior Publication Data

US 2012/0280556 A1 Nov. 8, 2012

Related U.S. Application Data

(63) Continuation-in-part of application No. 12/555,430, filed on Sep. 8, 2009, now Pat. No. 8,152,232.

(60) Provisional application No. 61/094,649, filed on Sep. 5, 2008.

(51) Int. Cl.
*A47C 1/034* (2006.01)
*F16C 1/26* (2006.01)

(52) U.S. Cl.
CPC ............... *A47C 1/0342* (2013.01); *F16C 1/26* (2013.01)

(58) Field of Classification Search
USPC ..... 297/85 C, 463.1; 74/501.5 R, 501.6, 502, 74/502.4, 502.6
See application file for complete search history.

(56) References Cited

U.S. PATENT DOCUMENTS

| | | | | |
|---|---|---|---|---|
| 2,869,391 | A * | 1/1959 | Brock | 74/503 |
| 3,653,277 | A * | 4/1972 | Gilmore | 74/502 |
| 3,732,748 | A * | 5/1973 | Cavalli | 74/502 |
| 3,831,406 | A * | 8/1974 | Gebhard et al. | 70/257 |
| 4,161,993 | A * | 7/1979 | Pitrat | 74/502 |
| 5,292,170 | A * | 3/1994 | LaPointe et al. | 297/85 C |
| 5,613,405 | A * | 3/1997 | Kelley et al. | 74/502.4 |
| 5,913,944 | A * | 6/1999 | Haynes et al. | 74/502.6 |
| 6,301,991 | B2 * | 10/2001 | Ficyk et al. | 74/502 |

* cited by examiner

*Primary Examiner* — Peter Brown
(74) *Attorney, Agent, or Firm* — Pitts & Lake, P.C.

(57) ABSTRACT

A release handle is adapted to activate a portion of a chair or sofa, such as a foot rest or a recline mechanism. The handle allows a user to selectively control the movement of functions of the chair. The handle is coupled to a cable, which is used to release a mechanism on the chair, such as the footrest. The handle includes a grip that is coupled to an annular tube at one end. The annular tube is telescopically coupled to a guide tube. The annular tube protects the cable within the annular tube to prevent wear to the cable and to prevent breakage.

16 Claims, 18 Drawing Sheets

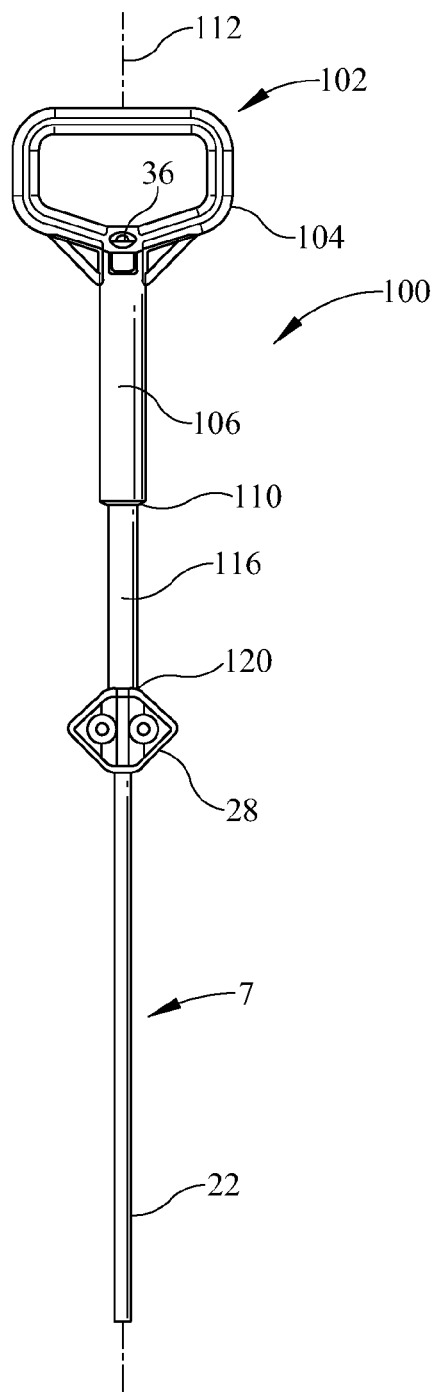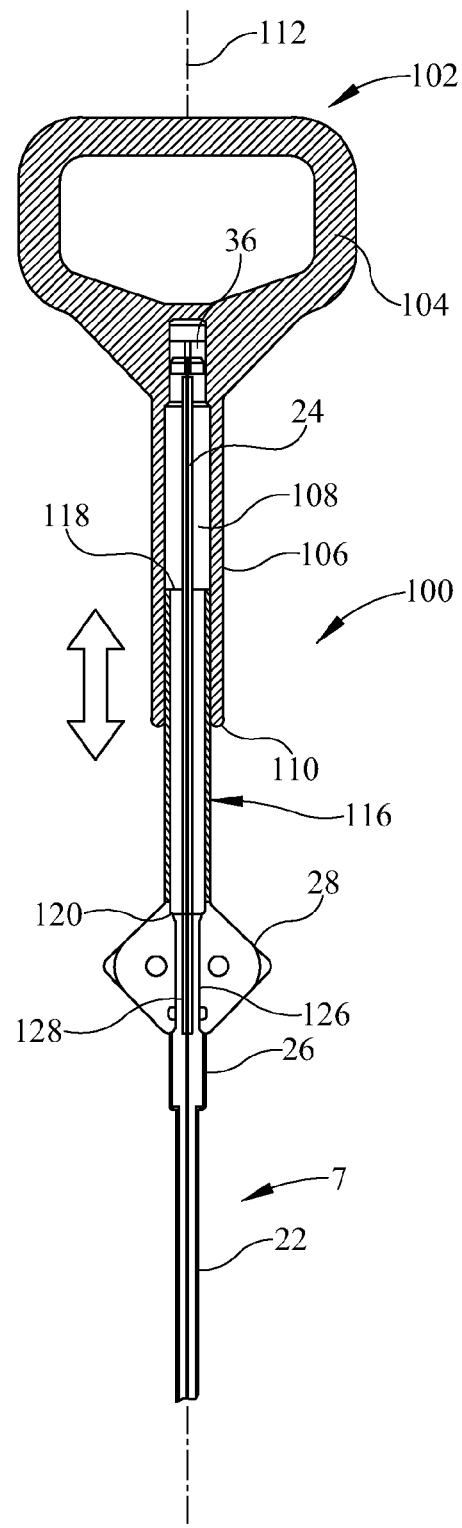
FIG. 17
FIG. 18

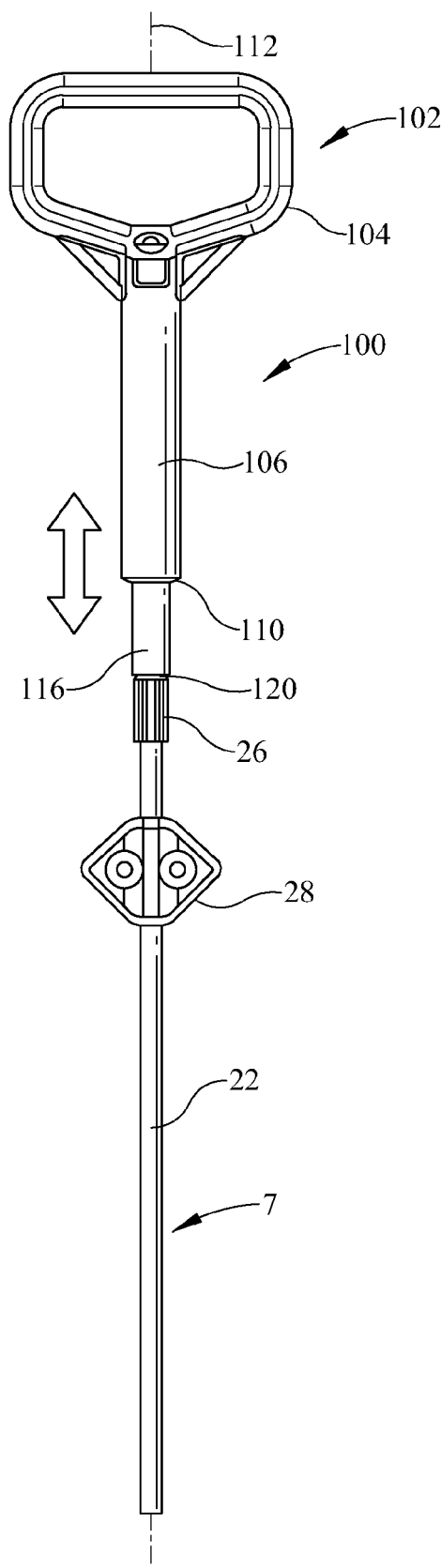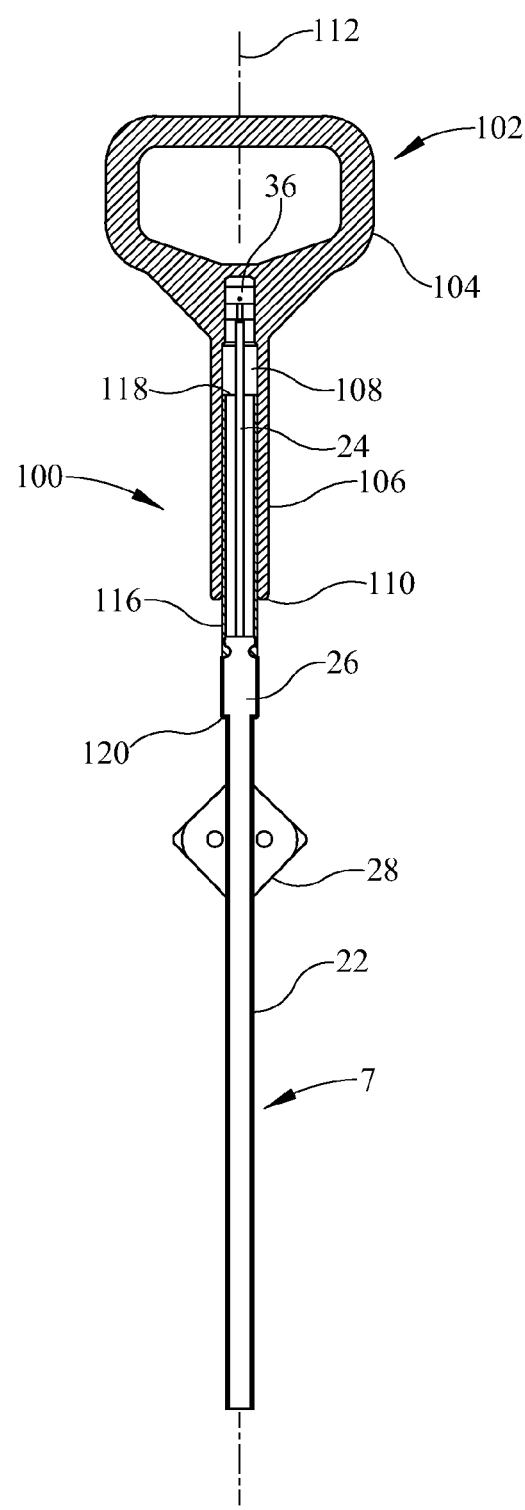
FIG. 19
FIG. 20

ACTIVATION DEVICE FOR MOTION ACTIVATED FURNITURE

This application is a continuation-in-part of U.S. application Ser. No. 12/555,430, filed Sep. 8, 2009, which claims the benefit of U.S. Provisional Patent Application Ser. No. 61/094,649, filed Sep. 5, 2008, which are herein incorporated by reference.

BACKGROUND

The present disclosure relates to furniture, and particularly to motion activated furniture. More particularly, the present disclosure relates to an activation device having a release handle that is used to activate a portion of the motion activated furniture, such as an extendable footrest. Current handle designs that are positioned between the armrest and the seat cushion of the chair are coupled to a cable that transmits the upward movement of the release handle to either release a footrest, recline the chair or both. Often times, due to consumer movement of the release handle while watching TV the cable can become frayed and break.

SUMMARY

According to the present disclosure, a furniture activation device includes a release handle adapted to activate a portion of a chair or sofa, such as a footrest or a recline mechanism. The handle allows a user to selectively control the movement of functions of the chair.

In illustrative embodiments, the handle is coupled to a cable, which is used to release a mechanism on the chair, such as the footrest. The handle includes a D-shaped ring that is coupled to an annular tube at one end. The annular tube of the handle is telescopically coupled to an annular guide tube. The cable wire of a cable extends through the annular guide tube into the annular tube and is connected to the handle. The annular tube protects the cable wire to prevent wear to the cable wire and to prevent breakage. The handle also includes a retention slot positioned at the top of the annular tube, at the junction of the tube and the D-ring. The retention slot is adapted to allow an end fitting of the cable to be snapped into the handle to secure its position. The handle also includes a pass through slot that is adapted to allow the barrel end of the cable to pass through the annular tube to allow the barrel end to be rotated 90 degrees and snapped into the retention slot.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 17 is a rear perspective view of a modified embodiment of the furniture activation device showing the handle extended with respect to the cable sheath and with respect to a guide sleeve that is telescopically coupled to the annular tube of the handle;

FIG. 18 is a front cross-sectional view of the furniture activation device of FIG. 17;

FIG. 19 is a rear perspective view of the furniture activation device as generally shown in FIG. 17 showing the handle in a retracted position prior to being pulled to release the chair mechanism and showing the guide sleeve extending into the annular tube of the handle, but showing the sheath of the cable coupled to the guide tube; and FIG. 20 is a front cross-sectional view of the furniture activation device of FIG. 19.

DETAILED DESCRIPTION

Figure 1:
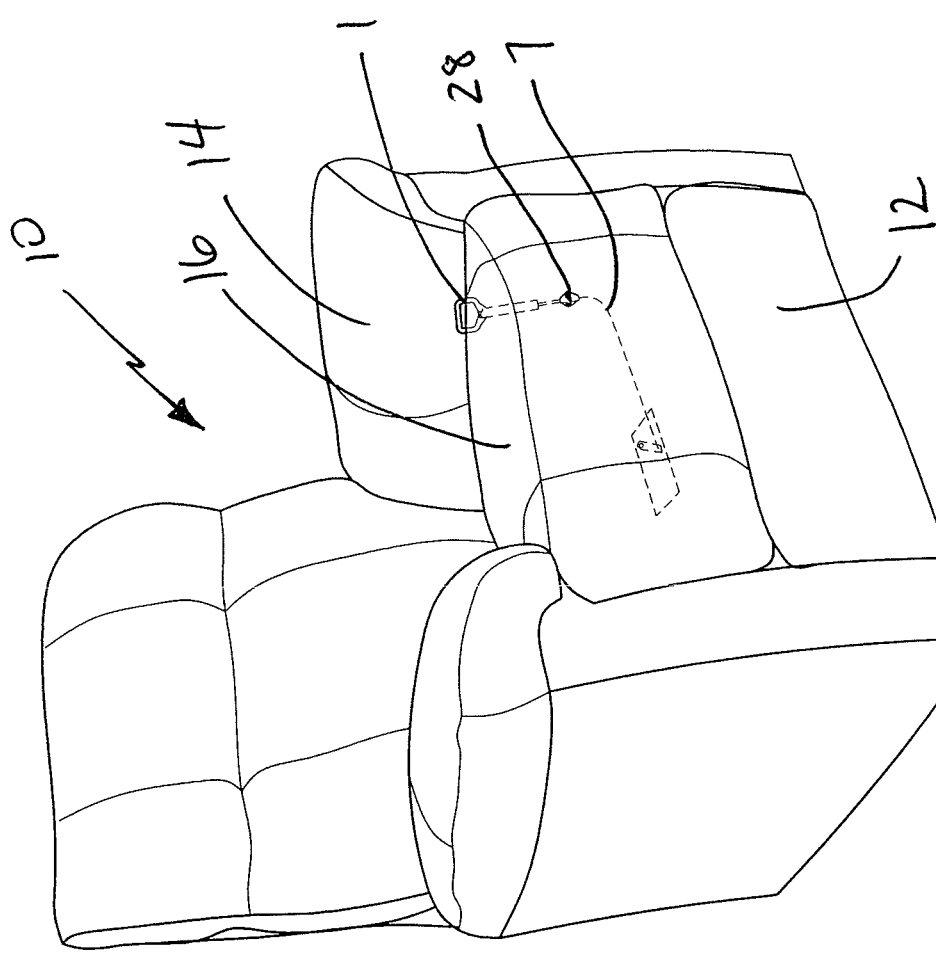
FIG. 1 is a perspective view of a chair having an actuation device with a release handle positioned between the armrest and seat cushion of the chair.

While the present disclosure may be susceptible to embodiment in different forms, there are shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Figure 2:
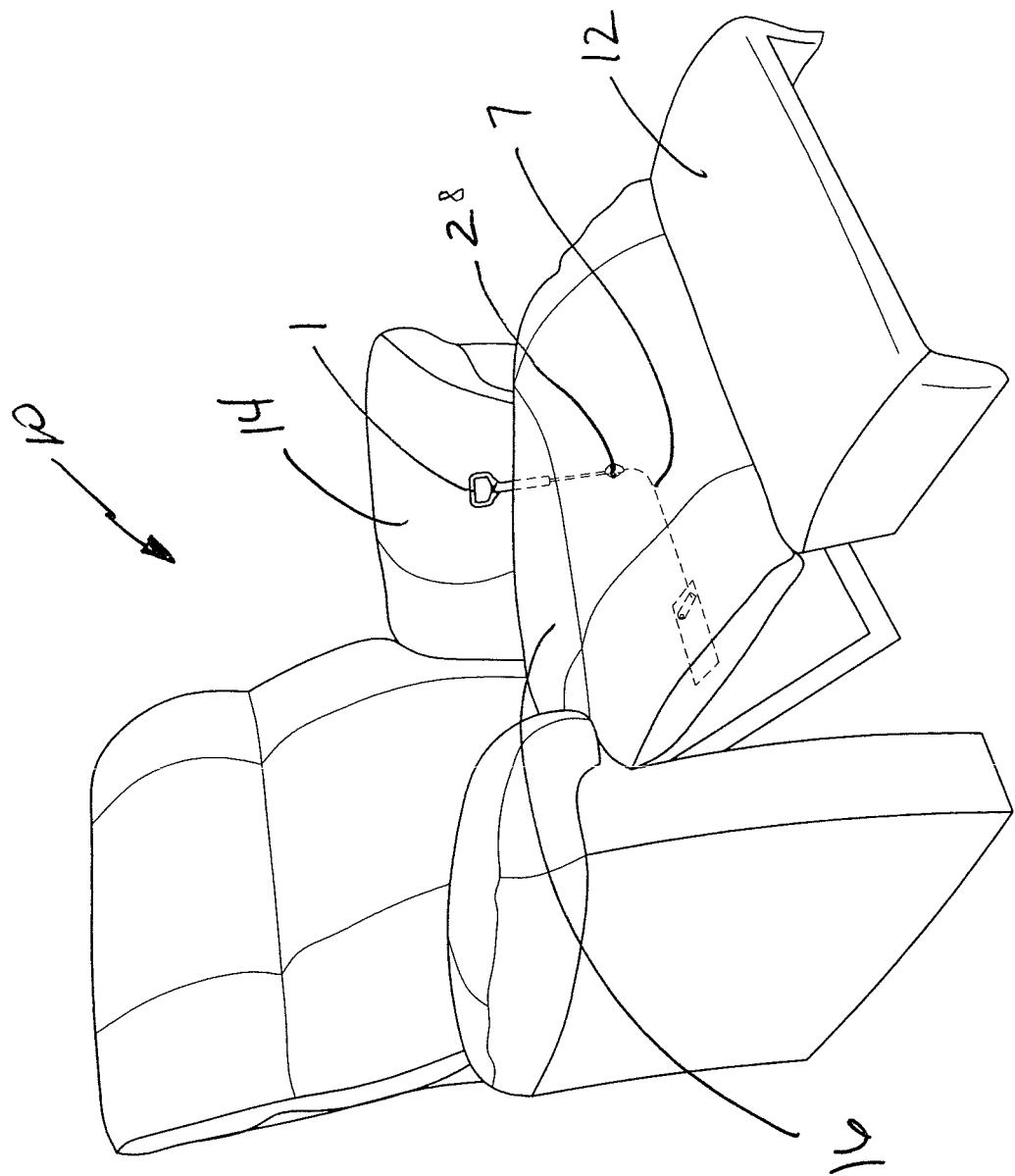
FIG. 2 is a perspective view of the chair showing the release handle after the handle has been pulled by a user sitting in the chair.

Motion furniture requires a device to activate the mechanism to cause a footrest 12 to extend or portions of the chair 10 to recline, as shown in FIGS. 1 and 2. One way to accomplish this action is by using a cable 7 and handle pull 1, as shown in FIGS. 2-6. Excessive wear and breakage to the cable can be caused by incorrect assembly or when the chair occupant excessively wiggles the handle, causing the cable to flex. Excessive movement of the handle puts undue strain on the area of the cable where the handle 1 attaches to the cable 7. Handle 1 is positioned between armrest 14 and seat cushion 16, as shown in FIGS. 1 and 2.

Figure 3:
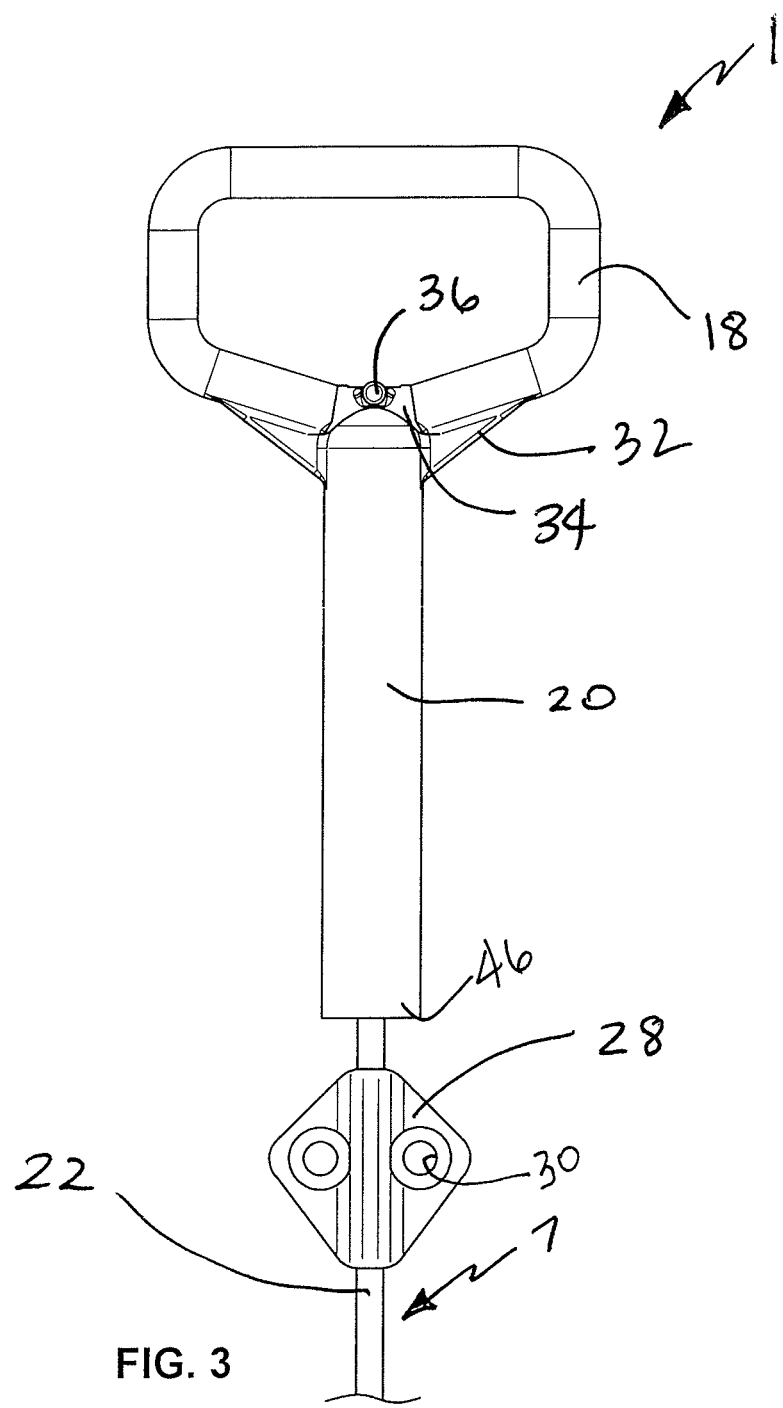
FIG. 3 is a perspective view of the release handle prior to pulling the handle to release the chair mechanism and showing the handle ring coupled to the annular tube and showing cable sheath extending into the annular tube of the handle.
Figure 4:
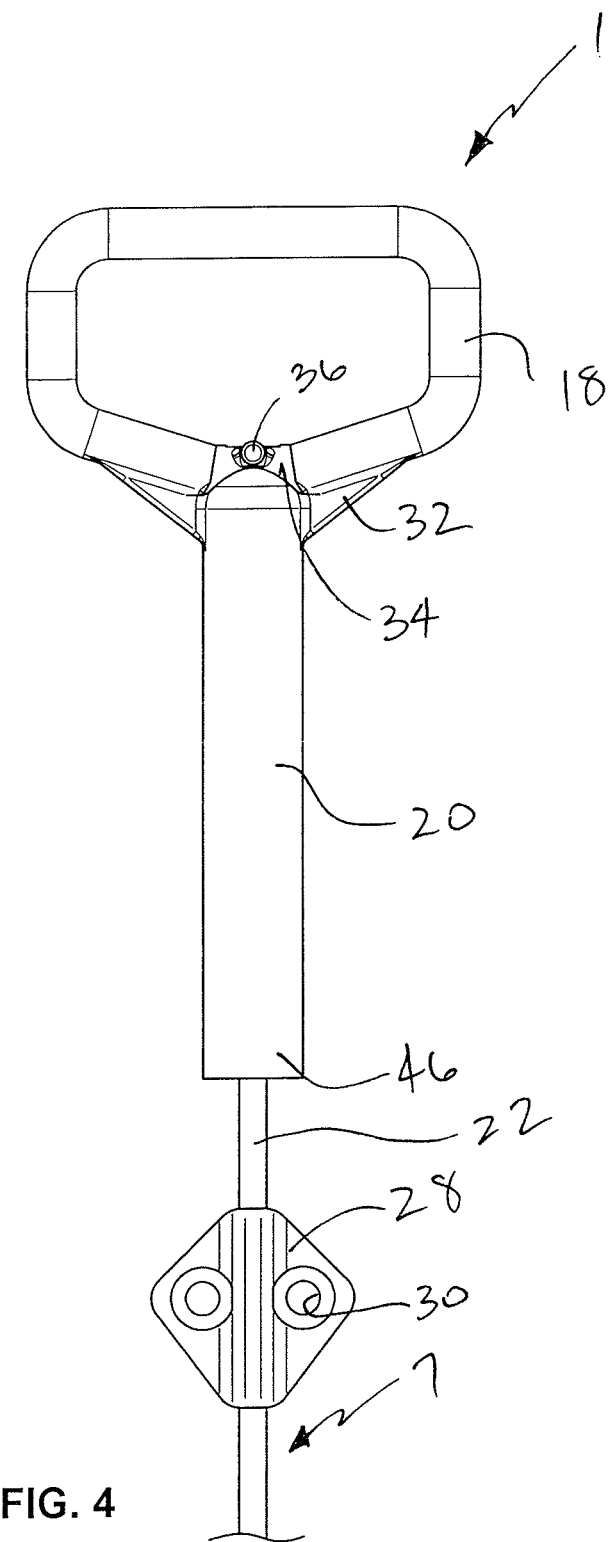
FIG. 4 is another perspective view of the release handle as it is being pulled showing the spacing between the annular tube and the cable bracket increasing as the handle is being pulled.
Figure 5:
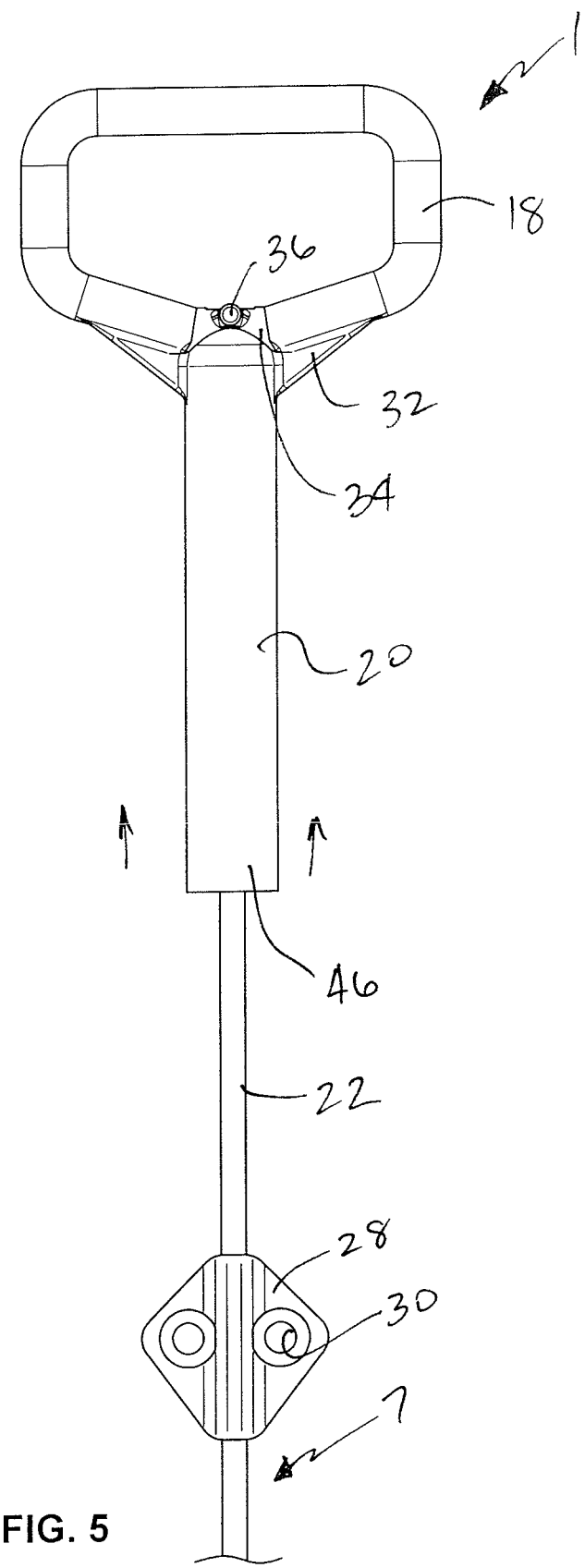
FIG. 5 is yet another perspective view of the release handle showing the handle fully extended with respect to the cable.
Figure 6:
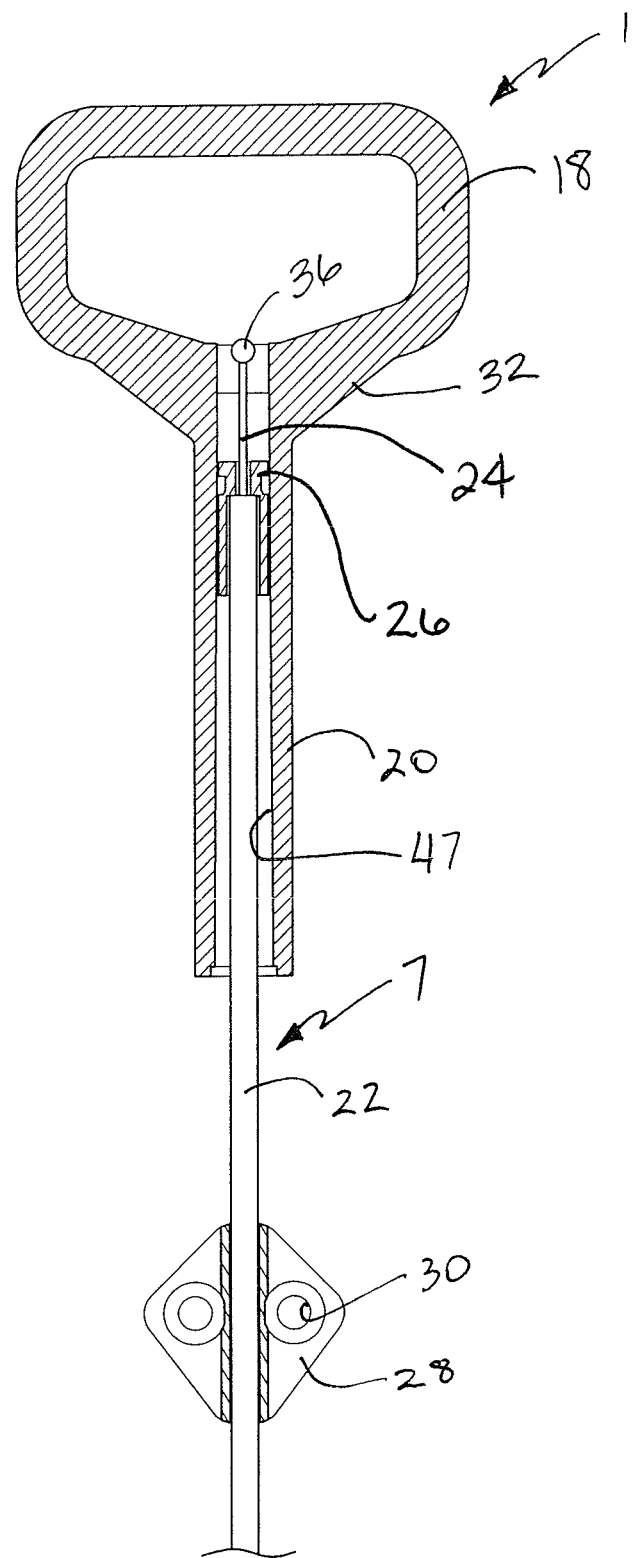
FIG. 6 is a perspective view of the handle with portions cut away showing the cable sheath and cable end fitting extending up into the annular tube of the handle to protect the cable wire that extends above the cable sheath from breakage and also showing the barrel end of the cable being positioned in the retention slot of the handle.
Figure 7:
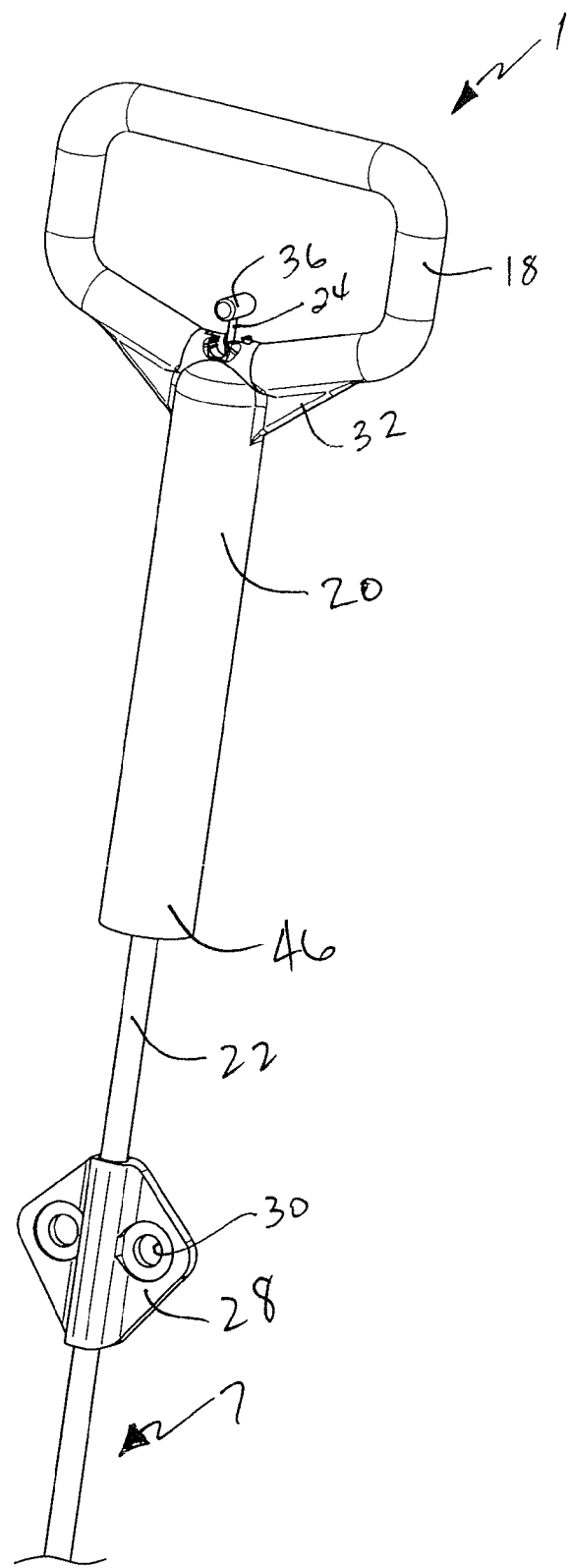
FIG. 7 is a perspective view of the handle.
Figure 8:
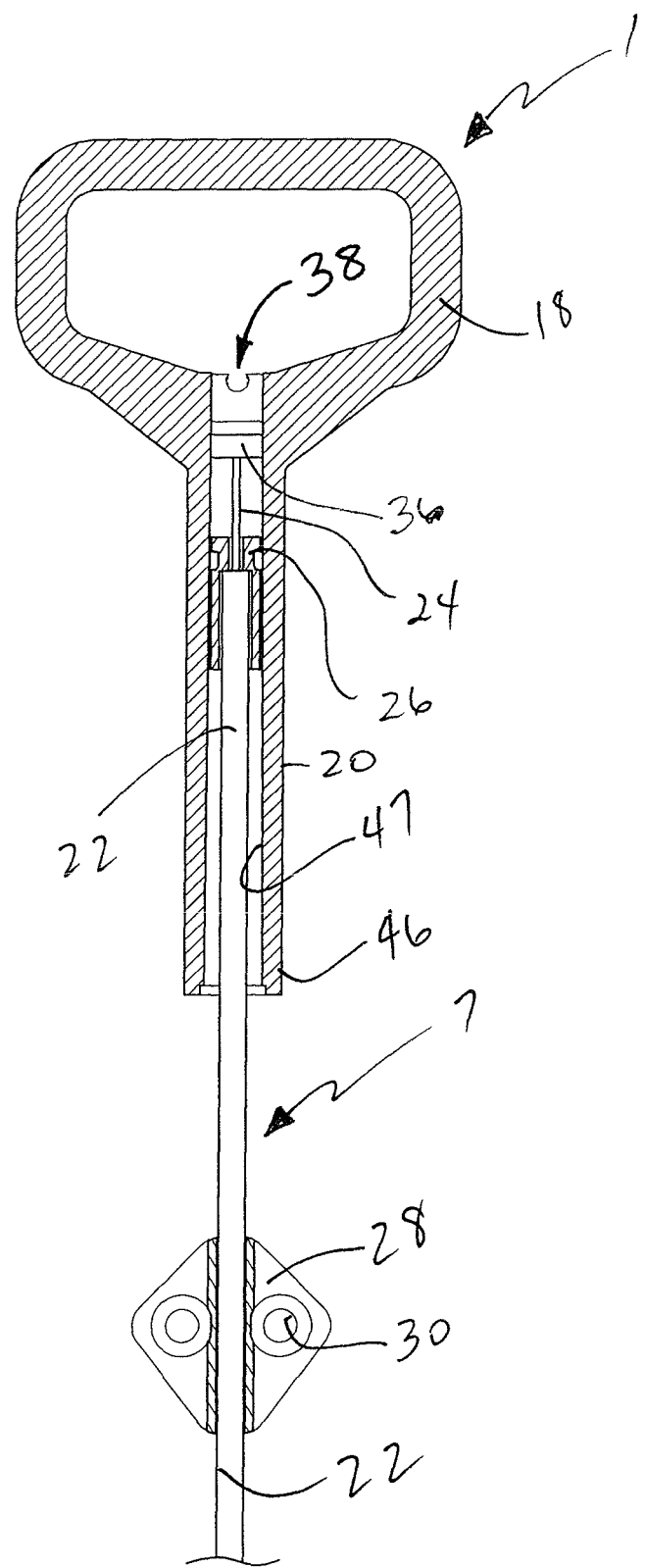
FIG. 8 is a perspective view similar to FIG. 6 showing the cable sheath and cable positioned within the annular tube of the handle and showing the barrel end fitting of the cable being inserted through the annular tube toward the pass through slot formed in the handle.
Figure 9:
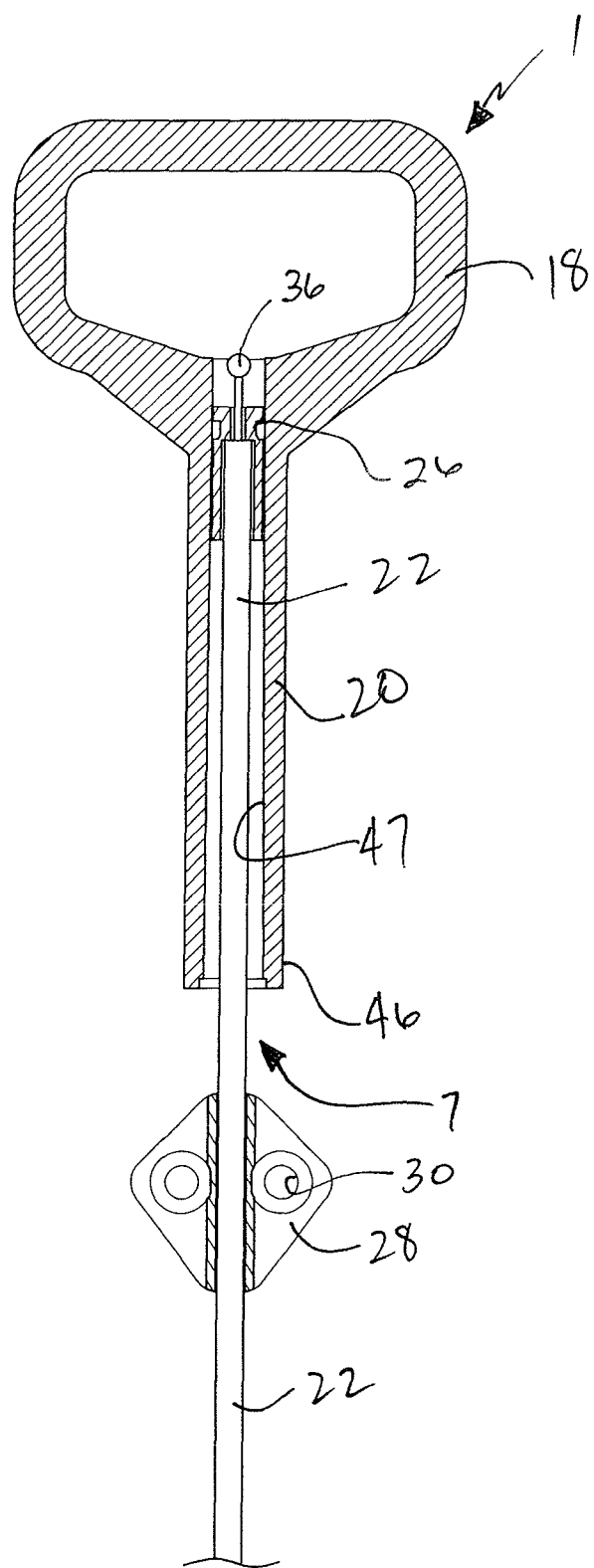
FIG. 9 is a sectional view similar to FIG. 8 showing the barrel end fitting of the cable positioned in the retention slot of the handle positioned near an upper end of the annular tube.

Handle 1 is coupled to cable 7 as shown in FIG. 3. Handle 1 includes a D-shaped grip ring 18 that is coupled to an elongated annular tube 20. Annular tube 20 of handle 1 is designed to extend over cable sheath 22 to act as a strain relief to keep the cable wire 24 that extends from the sheath 22 from flexing and ultimately failing. The elongated annular tube 20 of handle 1 also assists the cable wire 24 in being pulled in the line of draw (i.e. the pull direction of the handle) in a linear fashion. As shown in the drawings, elongated annular tube 20 of handle 1 telescopes over cable sheath 22 and cable end attachment 26 to prevent cable wire 24 from flexing (bend back and forth) with respect to cable end attachment 26, as shown in FIG. 6. Since cable wire 24 can not flex with respect to cable end attachment 26, the failure rate of the cable is significantly reduced.

Cable sheath 22 of cable 7 is secured to the furniture by use of bracket 28. Bracket 28 includes apertures 30 that are configured to accept screws (not shown) to secure the cable 7 to the chair 10. Handle 1 is preferably a molded one piece structure with grip ring 18 molded with elongated annular tube 20. Handle 1 also includes webs 32 to reinforce grip ring 18 to elongated annular tube 20. Handle 1 also include a cable retainer 34 that secures cable end 36 to handle 1.

Figure 10:
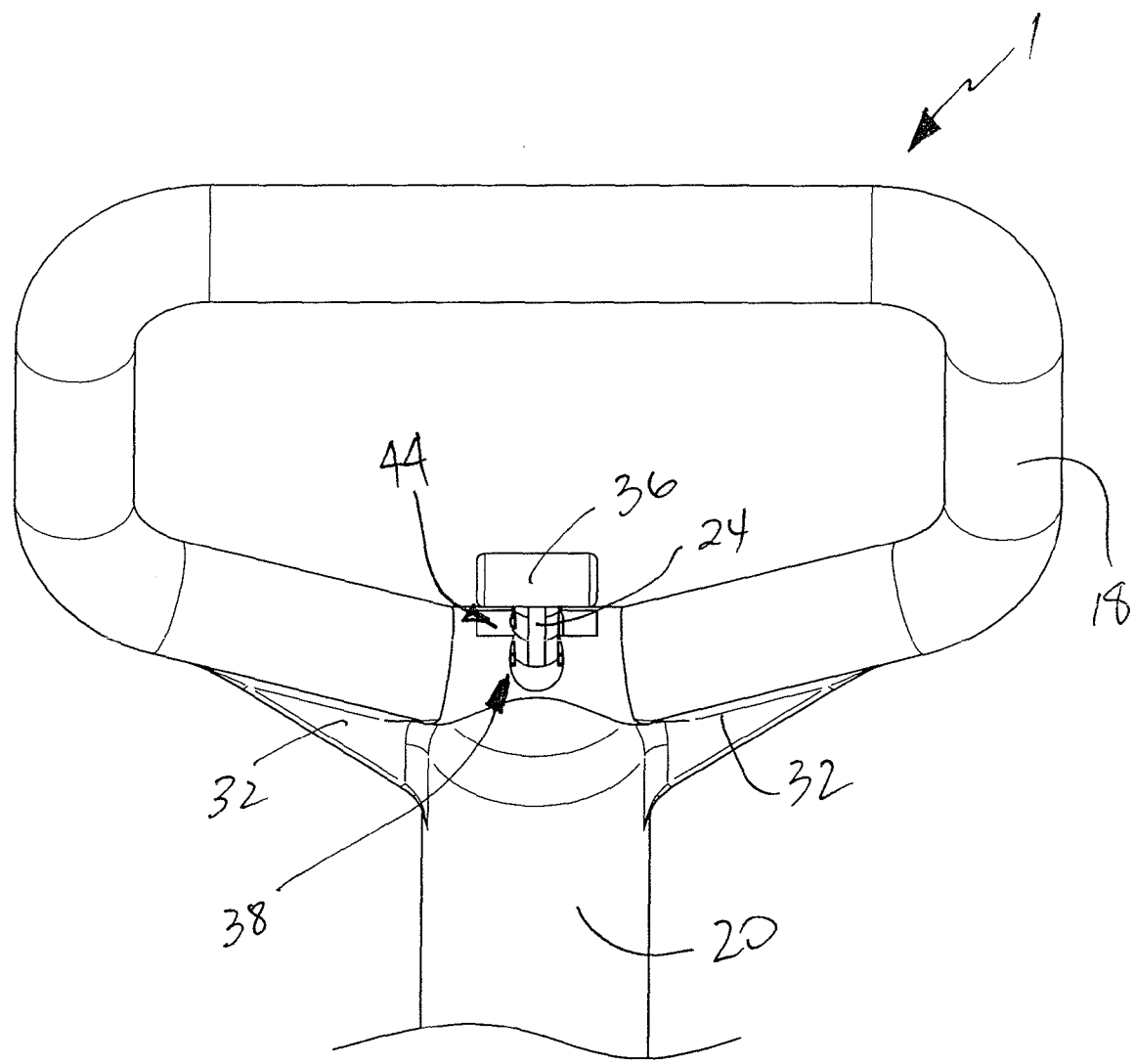
FIG. 10 is a perspective view of the handle showing the barrel end fitting of the cable passing through the pass through slot of the handle 90 degrees from the retention slot.
Figure 11:
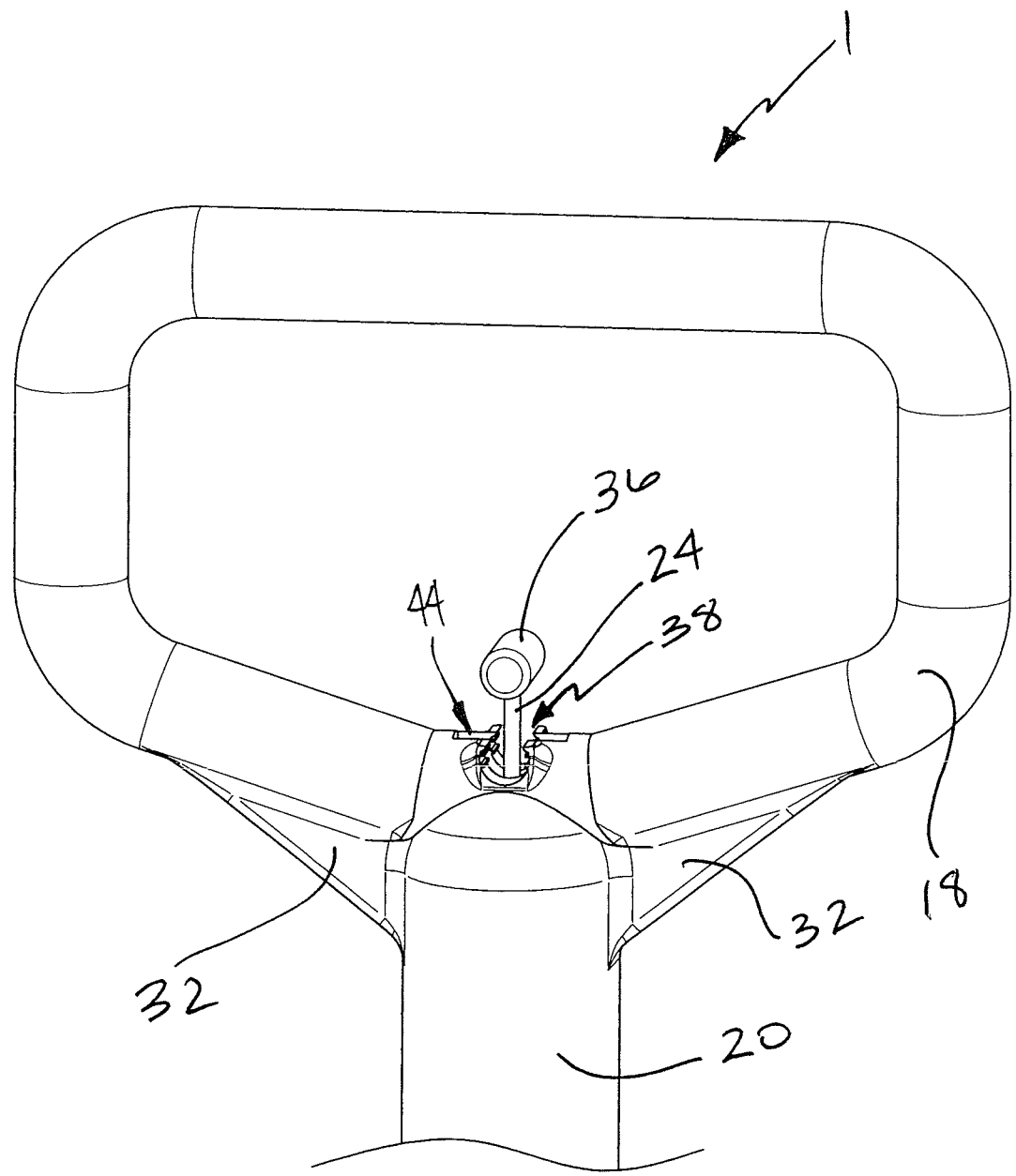
FIG. 11 shows the rotation of the barrel end fitting of the cable so that it is aligned to be snapped into the retention slot formed in the handle.
Figure 12:
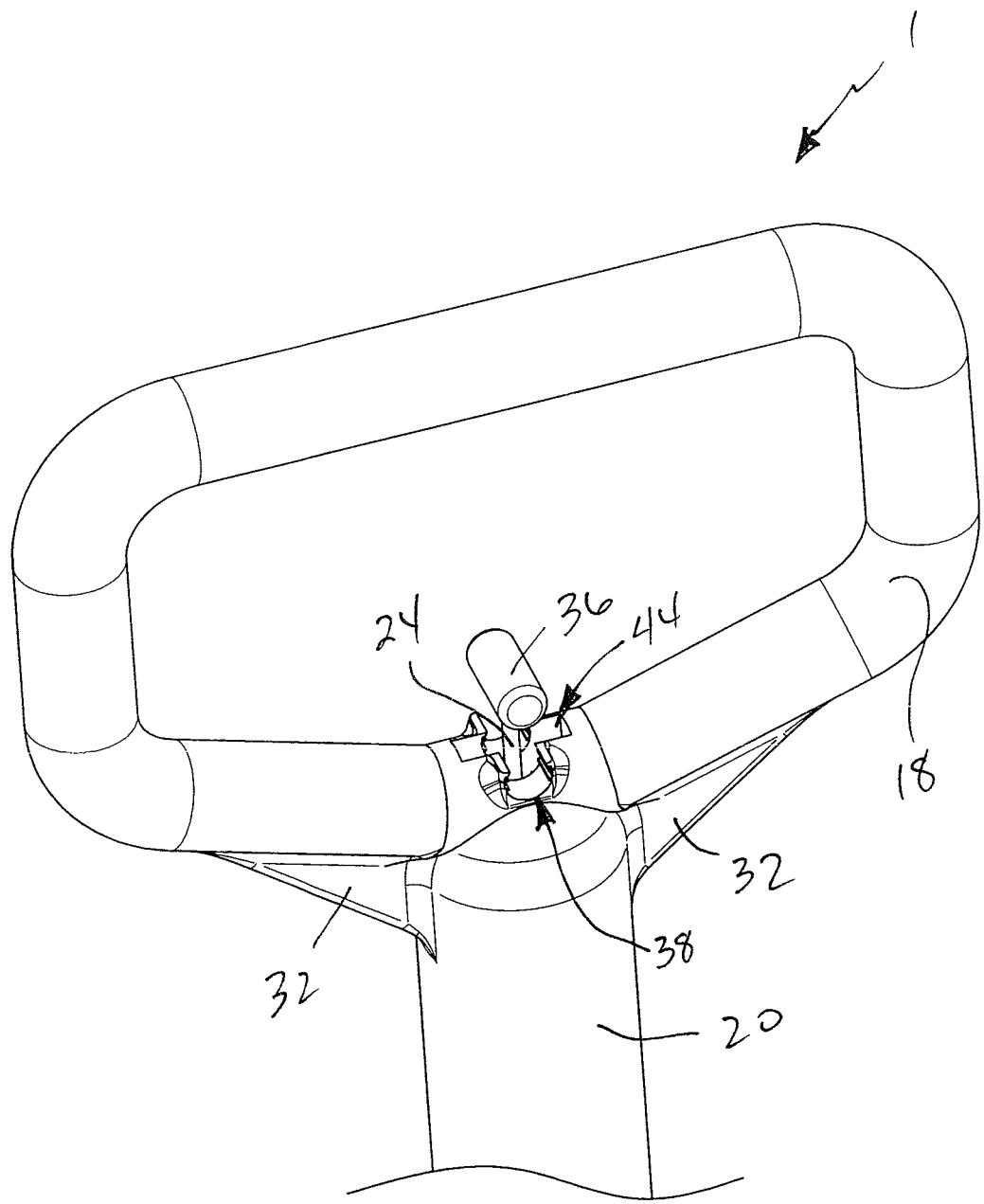
FIG. 12 is a perspective view of the handle showing the details of the pass through slot and the retention slot formed in the handle.
Figure 13:
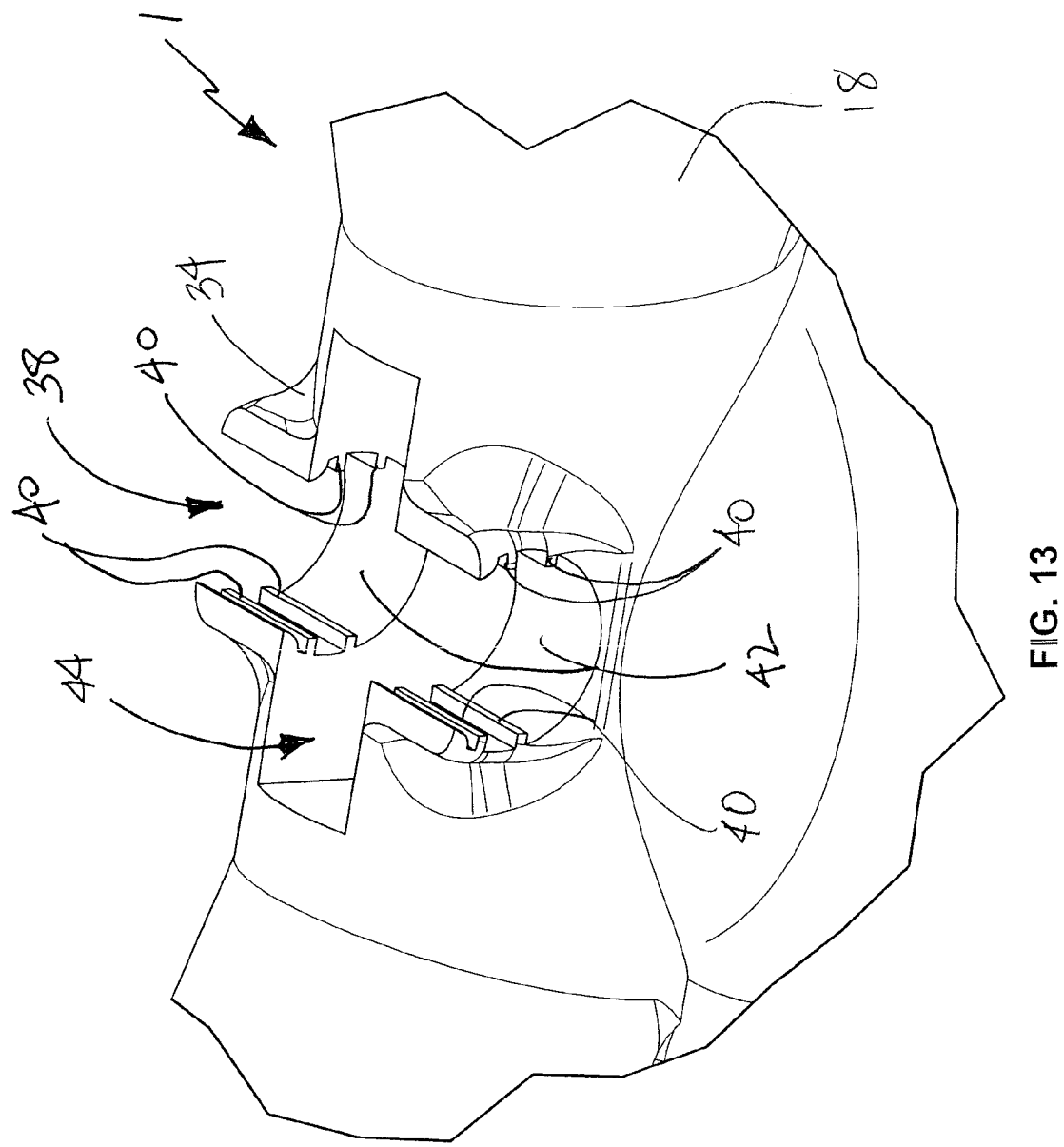
FIG. 13 is close up perspective view of the pass through slot and retention slot formed in the handle, the retention slot including a series of retention flanges to lock the barrel end fitting of the cable into the retention slot.

The handle 1 includes cable retainer 34 that is configured to include a snap-in feature in the form of a retention slot 38 for attaching the cable 7 to the handle 1, as shown in FIGS. 10-12, for example. Normally the connection of the cable to the handle is accomplished by over molding the handle onto the cable. This method permanently combines the cable and handle and if the cable breaks, both the handle and cable need to be discarded.

By incorporating retention slot 38 into the handle 1, cables 7 can be changed out if broken without changing the complete handle assembly. Retention slot 38 incorporates retention tabs 40 that are deformable projections 40 to prevent the cable end 36 from shifting or separating from handle 1. While a barrel-shaped end fitting is shown secured to the end of the cable 7, it is contemplated that other types of cable end fittings could also be used. The retention slot could also use a clip or other fastener means to fasten the cable to the handle.

Retention slot 38 of handle 1 is defined by curved walls 42 that engage barrel shaped end fitting 36 of cable 7. Walls 42 include retention tabs 40 that retain cable end fitting 36. Cable retainer 34 also includes pass through slot 44. Pass though slot 44 is perpendicular from retention slot 38 and is configured to allow cable end fitting 36 to pass through handle 1. This allows the cable 7 to be inserted from bottom end 46 of elongated annular tube 20, passed through pass through slot 44 and out handle 1. Once cable end fitting 36 exits pass through slot 44, end fitting 36 can be rotated 90 degrees and snapped into retention slot 38. Other retainers could also be used such as crimp on cable fittings that would retain the cable to the handle without the use of the retention slot 38.

Cable 7 passes through handle 1, as shown, for example, in FIG. 6. Elongated annular tube 20 of handle 1 includes a central bore 47 that extends the length of elongated tube 20. Cable sheath 22 and cable wire 24 are positioned within central bore 47. Cable end attachment 26 that is coupled to cable sheath is configured to have an outer diameter that is smaller that the diameter of central bore 46. This arrangement allows cable end attachment 26 to slide within central bore 47 of elongated annular tube 20 when handle 1 is pulled by a consumer to release a foot rest or recline chair 10.

As handle 1 is pulled upward, handle pulls on cable end fitting 36, which, in turn, pulls cable wire 24 from cable sheath 22 and cable end attachment 26. Movement of cable wire 24 within cable sheath 22 cause activation of the mechanism that releases the foot rest 12 of the chair 10. Damage to the cable wire 24 is minimized because the movement between the cable end attachment 26 and the cable wire 24 is generally linear with very little pivoting motion or side to side motion of the handle with respect to the cable sheath.

Figure 14:
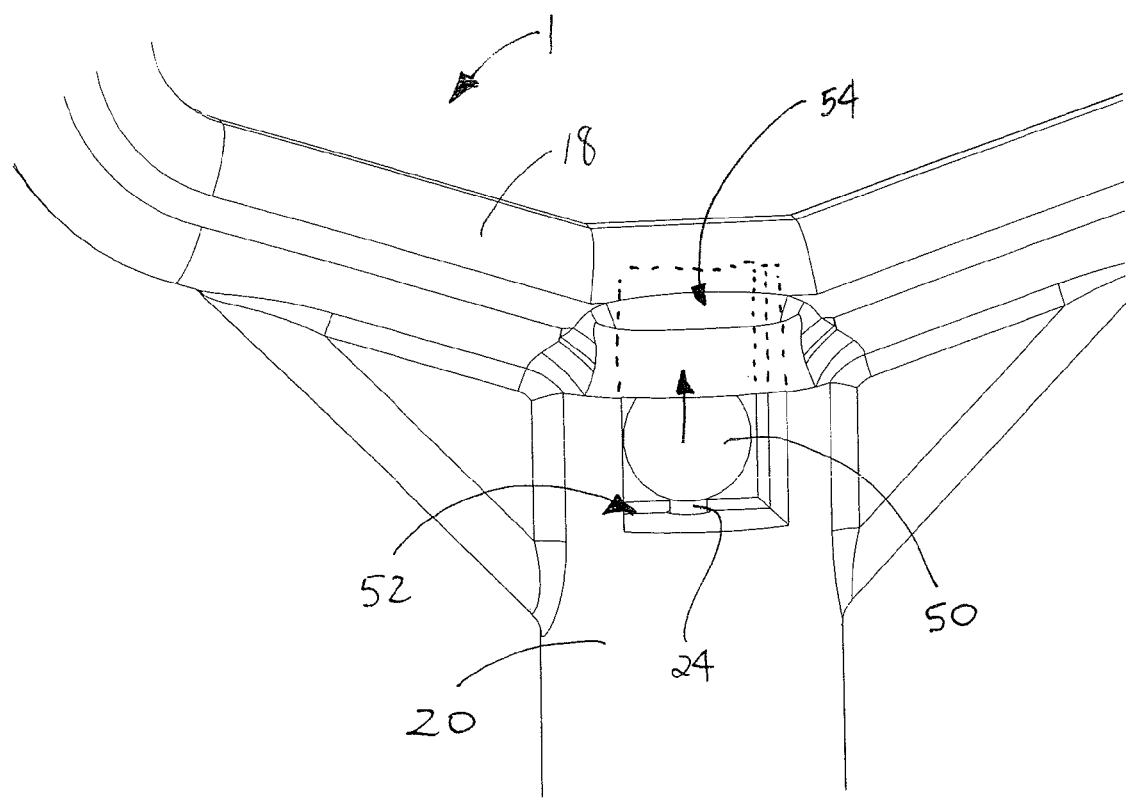
FIG. 14 is a perspective view of the handle using a ball end fitting on the end of the cable that is inserted into the elongated tube of the handle and into a cavity formed within the handle and wherein a clip, shown in FIG. 15 is used to retain the ball end fitting and cable within the handle.
Figure 15:
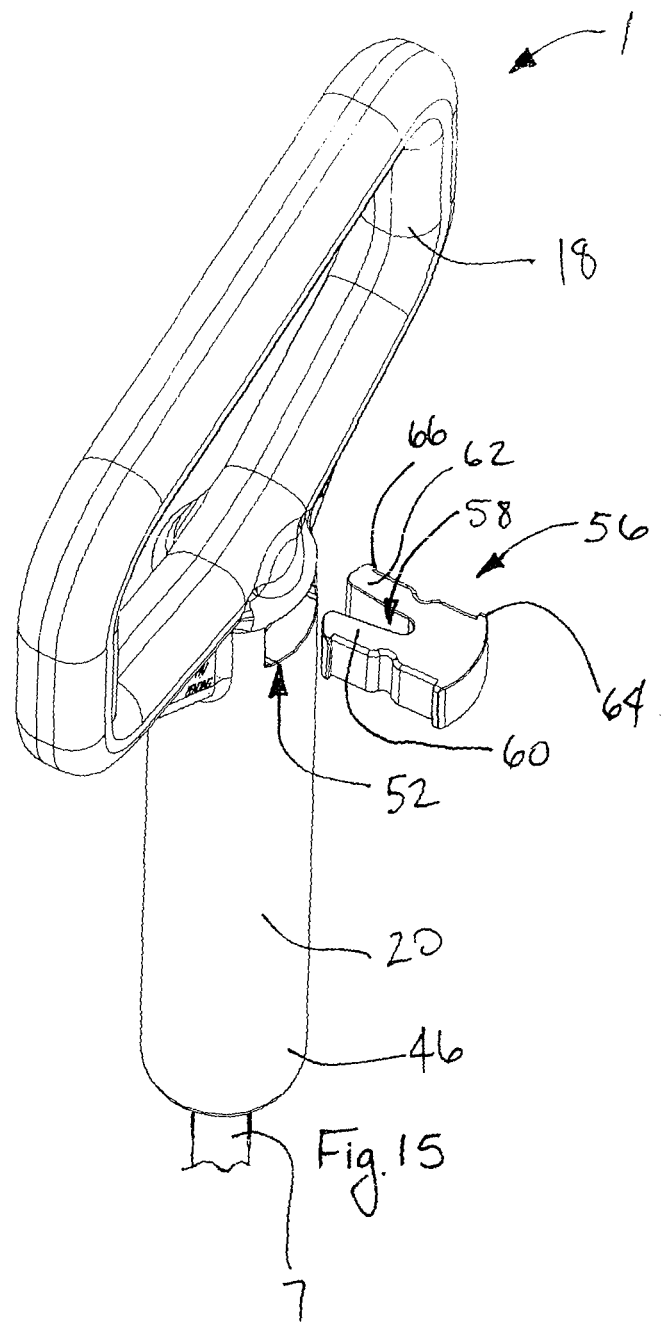
FIG. 15 is a perspective view of the handle showing the clip being inserted into a window formed in the elongated tube of the handle to retain the ball end fitting to secure the cable to the handle.

FIGS. 14 and 15 illustrate the use of a cable 7 having a ball end fitting 50. While a ball and fitting is shown, it is contemplated that other fittings could be used to secure cable 7 to handle 1. Handle 1, when using ball end fitting 50 includes a square window 52 formed in the side wall of the handle 1. Handle 1 is also formed to include a cavity 54. Cavity 54 is configured to accept ball end fitting 50 when cable 7 is inserted into elongated annular tube 20.

Window 52 of handle 1 is configured to accept retention clip 56, as shown, for example, in FIG. 15. Retention clip 56 is inserted into window 52 when ball end fitting 50 is positioned within cavity 54. Retention clip 56 connects the cable 7 to the handle 1 by trapping the ball end fitting 50 within cavity 54. Retention clip 56 includes a slot 58 defined by a pair of forks 60, 62. Slot 58 is configured to accept cable wire 24 of cable 7, which is attached to ball end fitting 50. Retention clip 56 also includes retention clips 64, 66, which retain retention clip 56 within the window 52 of handle 1.

Figure 16:
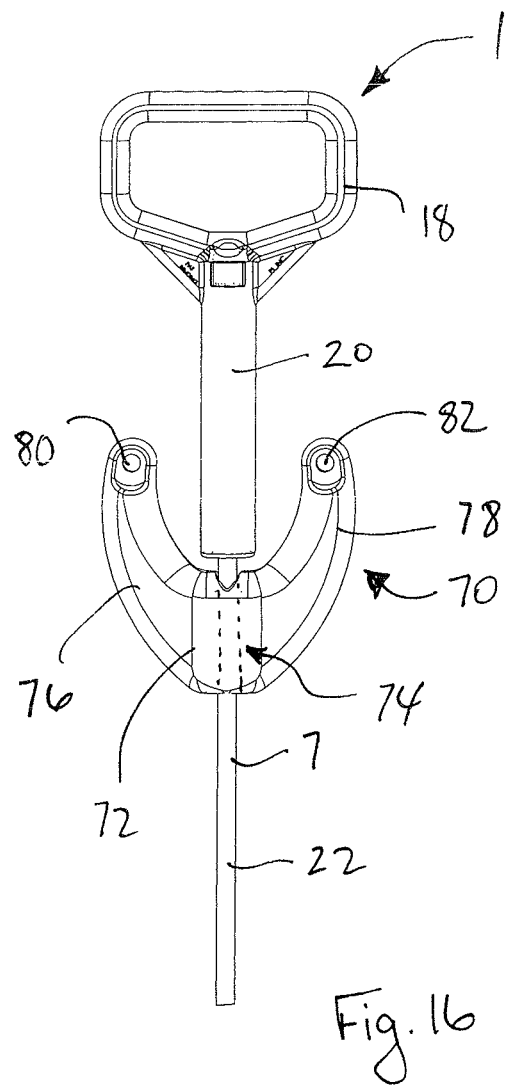
FIG. 16 is a perspective view of the handle showing a bracket used to secure the cable to the chair.

Handle 1 may also be used with bracket 70, as shown in FIG. 16. Bracket 70 is a c-shaped member that allows cable 7 to be coupled to the chair 10 closer to the handle 1. Bracket 70 includes a base portion 72 formed to include a channel 74. Channel 74 is configured to accept cable sheath 22 of cable 7. Bracket 70 also includes a pair of upswept wings 76, 78. Wings 76, 78 are formed to include apertures 80, 82 that are configured to accept fasteners (not shown) to secure bracket 70 to the chair 10.

In use, a user inserts the cable end fitting 36, cable end attachment 26 and a portion of the cable sheath 22 into the central bore 47 of the elongated annular tube 20 of handle 1. Cable end fitting 36 is moved through central bore 47 through pass through slot 44. Once cable end fitting 36 passes through pass through slot 44, the cable end fitting 36 is rotated ninety degrees and snapped into retention slot 38 of handle 1. With cable end fitting 36 positioned in retention slot 38, linear movement of the handle 1 away from the cable sheath 22 and cable end attachment 26 causes cable wire 24 to extend from cable sheath 22 to cause the release of the footrest 12 of the chair 10.

The pull handle 1 can be various shapes and materials such as plastic, metal or wood and be elliptical, round, square or D-shaped for example. The pull handle 1 or attachment can employ holes or slots to facilitate ease of manufacture.

Another embodiment of the furniture activation device is shown in FIGS. 17 and 18 and is identified with the reference number 100. Furniture activation device 100 includes a handle 102 having a hand grip such as a D-shaped grip ring 104 and a generally linear annular tube 106 having a generally cylindrical central bore 108 extending inwardly from the distal end 110 of annular tube 106. Annular tube 106 includes a generally linear central axis 112. Bore 108 extends along axis 112 and forms a generally cylindrical interior surface in annular tube 106. Handle 102 may be constructed in the same manner as handle 1 described above.

Furniture activation device 100 also includes an annular guide tube 116 extending between a proximal end 118 and a distal end 120. Guide tube 116 includes a generally cylindrical central bore 122 and a generally cylindrical outer surface. Guide tube 116 extends concentrically along central axis 112 of annular tube 106. Annular tube 106 of handle 102 is telescopically coupled to guide tube 116. As shown in FIG. 18, proximal end of 118 of guide tube 116 is located within central bore 108 of annular tube 106 of handle 102. Annular tube 106 of handle 102 is selectively manually telescopically slidable with respect to guide tube 116 generally linearly along central axis 112 between an extended position, wherein distal end 110 of annular tube 106 is located adjacent proximal end 118 of guide tube 116, and a retracted position wherein distal end 110 of annular tube 106 is located more closely adjacent distal end 120 of guide tube 116. Alternatively, distal end 110 of annular tube 106 may be located within central bore 122 of guide tube 116 such that annular tube 106 and guide tube 116 are similarly telescopically coupled to one another. Movement of the handle 102 and annular tube 106 between the retracted and extended positions causes the cable end 36 to correspondingly retract and extend with respect to the cable attachment end 26 and the cable sheath 22.

Guide tube 116 may be coupled to bracket 28 and thereby to chair 10. Guide tube 116 may be permanently or removeably coupled to bracket 28. Cable attachment end 26 may be coupled to bracket 28 or distal end 120 of guide tube 116 such that the proximal end of cable sheath 22 is stationarily coupled to bracket 28 or guide tube 116. Cable wire 24 extends outwardly from cable attachment end 26, through central bore 122 of guide tube 116, and into central bore 108 of annular tube 106 of handle 102. Cable end 36 is attached to handle 102 as described above in regard to FIGS. 3-16.

The telescopic coupling of annular tube 106 of handle 102 to guide tube 116 limits movement of cable end 36 to generally linear movement along central axis 112 when handle 102 is selectively manually moved by a user between the retracted and extended positions of the handle 102, thereby preventing bending or flexing of the portion of cable wire 24 that extends outwardly beyond cable attachment end 26 and thereby preventing damage to cable wire 24.

Bracket 28 may include a generally linear connector tube 126 having a generally linear central bore 128 that extends along central axis 112. Distal end 120 of guide tube 116 may be attached to a proximal end of connector tube 126 and cable attachment end 26 of cable 7 may be attached to a distal end of connector tube 126. Cable wire 24 extends from cable attachment end 26 through central bore 128 of connector tube 126 and through central bore 122 of guide tube 116. Cable attachment end 26 and distal end of guide tube 116 may be removably connected to connector tube 126 of bracket 28.

FIGS. 19 and 20 show the furniture activation device 100 having a handle 102 and an annular tube 106 telescopically coupled to a guide tube 116. As shown in FIGS. 19 and 20, cable sheath 22 of cable 7 is stationarily coupled to bracket 28 and thereby to chair 10. Cable sheath 22 extends outwardly from both sides of bracket 28. Cable attachment end 26 is coupled to distal end 120 of guide tube 116. Cable wire 24 extends outwardly from cable attachment end 26 and through central bore 122 of guide tube 116 and into central bore 108 of annular tube 106 of handle 102. Annular tube 106 of handle 102 is telescopically movable in a generally linear direction along axis 112 with respect to guide tube 116 between retracted and extended positions to thereby extend and retract cable end 36 with respect to cable attachment end 26 and cable sheath 22. Annular tube 106 and annular guide tube 116 prevent flexing of the portion of the cable wire 24 that extends outwardly beyond cable attachment end 26 and thereby prevent damage to cable wire 24.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. An activation device for motion activated furniture for use with a cable having a cable sheath and a cable wire movable within the cable sheath, wherein the activation device and the cable are used to activate a function of the furniture, the activation device comprising:

a handle defining a hand grip adapted to be manually engaged and gripped and an elongate annular tube coupled to the hand grip, the annular tube having a generally linear central axis and a central bore extending along the central axis, the handle further defining a cable retainer configured to releasably connect a cable wire received within the central bore to the handle, the cable retainer comprising an opening and a recess defined by the handle, the recess being configured to accept an end fitting of the cable wire, and a retention clip configured to fit within the opening to retain the cable wire to the handle; and a guide tube telescopically coupled to the annular tube of the handle, the guide tube having a proximal end, a distal end and a central bore, the guide tube adapted to allow the cable wire to extend through the central bore of the guide tube, into the central bore of the annular tube of the handle, and to the cable retainer for releasable connection to the handle;

whereby the handle is selectively movable between a retracted position and an extended position, wherein the annular tube of the handle moves telescopically with respect to the guide tube along the central axis to cause the cable wire to move with respect to the cable sheath of the cable.

2. The activation device of claim 1 wherein the annular tube of the handle includes a distal end, and the proximal end of the guide tube is located within the central bore of the annular tube, the guide tube extending outwardly from the distal end of the annular tube when the handle is in the extended position with respect to the guide tube.

3. The activation device of claim 1 wherein the central bore of the annular tube is generally cylindrical and the outer surface of the guide tube is generally cylindrical.

4. The activation device of claim 1 further comprising a bracket adapted to be attached to the furniture, the guide tube adapted to be attached to the bracket.

5. The activation device of claim 4 wherein the bracket includes a connector tube having a central bore, the distal end of the guide tube adapted to be coupled to the connector tube, and the cable wire adapted to extend through the central bore of the connector tube into the central bore of the guide tube.

6. The activation device of claim 5 wherein the connector tube is adapted to be coupled to the cable sheath of the cable.

7. The activation device of claim 1 wherein the distal end of the guide tube is adapted to be coupled to the cable sheath of the cable.

8. The activation device of claim 1, wherein the retention clip includes a slot configured to accept the cable.

9. A piece of furniture comprising:
   a seat portion, a back portion and a movable footrest;
   a cable operatively coupled to the piece of furniture, the cable comprising a cable sheath and a cable wire movable within the cable sheath;
   a handle defining a hand grip adapted to be manually engaged and gripped and an elongate annular tube coupled to the hand grip, the annular tube having a generally linear central axis and a central bore extending along the central axis;
   a guide tube telescopically coupled to the annular tube of the handle, the guide tube having a proximal end, a distal end and a central bore, the cable wire extending through the central bore of the guide tube and into the central bore of the annular tube of the handle; and
   a cable retainer defined by the handle, the cable retainer releasably connecting the cable to the handle, the cable retainer further comprising an opening and a recess defined by the handle, the recess accepting an end fitting of the cable wire, and a retention clip fitted within the opening to retain the cable wire to the handle;
   whereby the handle is selectively movable between a retracted position and an extended position along the guide tube, wherein the annular tube moves telescopically with respect to the guide tube along the central axis to cause the cable wire to move with respect to the cable sheath of the cable.

10. The piece of furniture of claim 9 wherein the annular tube of the handle includes a distal end, and the proximal end of the guide tube is located within the central bore of the annular tube, the guide tube extending outwardly from the distal end of the annular tube when the handle is in the extended position with respect to the guide tube.

11. The piece of furniture of claim 9 wherein the central bore of the annular tube is generally cylindrical and the outer surface of the guide tube is generally cylindrical.

12. The piece of furniture of claim 9 further comprising a bracket adapted to be attached to the furniture, the guide tube adapted to be attached to the bracket.

13. The piece of furniture of claim 12 wherein the bracket includes a connector tube having a central bore, the distal end of the guide tube adapted to be coupled to the connector tube, and the cable wire adapted to extend through the central bore of the connector tube into the central bore of the guide tube.

14. The piece of furniture of claim 13 wherein the connector tube is adapted to be coupled to the cable sheath of the cable.

15. The piece of furniture of claim 9 wherein the distal end of the guide tube is adapted to be coupled to the cable sheath of the cable.

16. The activation device of claim 9, wherein the retention clip includes a slot which accepts the cable.

\* \* \* \* \*